United States Patent
Gu

(10) Patent No.: US 6,556,263 B2
(45) Date of Patent: Apr. 29, 2003

(54) IN-PLANE SWITCHING COLOR LCD PANEL IMPLEMENTING ELECTRO-CONDUCTIVE POLARIZER AND FABRICATING METHOD THEREOF

(75) Inventor: Dong-Hyo Gu, Kyoungsangbuk-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 246 days.

(21) Appl. No.: 09/783,300

(22) Filed: Feb. 15, 2001

(65) Prior Publication Data

US 2001/0015784 A1 Aug. 23, 2001

(51) Int. Cl.[7] ............................................. G02F 1/1335
(52) U.S. Cl. ........................ 349/96; 349/40; 349/139; 349/187; 349/141
(58) Field of Search ............................ 349/40, 96, 139, 349/141, 187; 313/110, 113, 478, 479; 430/20, 5, 321

(56) References Cited

U.S. PATENT DOCUMENTS

| | | | | |
|---|---|---|---|---|
| 5,870,160 A | * | 2/1999 | Yanagawa et al. | 349/141 |
| 5,986,737 A | * | 11/1999 | Evanicky et al. | 349/137 |
| 6,147,738 A | * | 11/2000 | Okamoto | 349/122 |

* cited by examiner

Primary Examiner—Robert H. Kim
Assistant Examiner—Tai Duong
(74) Attorney, Agent, or Firm—McKenna Long & Aldridge LLP

(57) ABSTRACT

An IPS-LCD panel includes first and second substrates, and a liquid crystal interposed therebetween. An electro-conductive polarizer is formed on the second substrate of the IPS-LCD panel, and a ground electrode surrounds the electro-conductive polarizer. The electro-conductive polarizer and ground electrode prevent exterior static electricity from affecting the liquid crystal layer.

15 Claims, 5 Drawing Sheets

US 6,556,263 B2

IN-PLANE SWITCHING COLOR LCD PANEL IMPLEMENTING ELECTRO-CONDUCTIVE POLARIZER AND FABRICATING METHOD THEREOF

This application claims the benefit of Korean Patent Application No. 2000-7711, filed on Feb. 18, 2000, which is hereby incorporated by reference.

BACKGROUND OF THE INVENTION

1. Field of the Invention

The present invention relates to a color liquid crystal display device, and more particularly to a color liquid crystal display device implementing in-plane switching (IPS) where an electric field to be applied to liquid crystal is generated in a plane parallel to a substrate.

2. Discussion of the Related Art

Recently, liquid crystal display (LCD) devices with light, thin, and low power consumption characteristics are used in office automation equipment and video units and the like. Such LCDs typically uses optical anisotropy and spontaneous polarization of a liquid crystal (LC). The LC has thin and long LC molecules, which causes an orientational alignment of the LC molecules. Therefore, alignment direction of the LC molecules is controlled by applying an electric field to the LC molecules. When the alignment direction of the LC molecules is properly adjusted, the LC molecules are aligned and light is refracted along the alignment direction of the LC molecules to display image data. By now, an active matrix (AM) LCD, in which a plurality of thin film transistors and pixel electrodes are arranged in an array matrix, is of particular interest because of its high resolution and superiority in displaying moving pictures. Driving methods for such LCDs typically include a twisted nematic (TN) mode and a super twisted nematic (STN) mode.

Although TN-LCDs and STN-LCDs have been put to practical use, they have a drawback in that they have a very narrow viewing angle. In order to solve the problem of narrow viewing angle, IPS-LCD devices have been proposed. A color IPS-LCD device typically includes a lower substrate where a pixel electrode and a common electrode are disposed, an upper substrate having a color filter, and a liquid crystal interposed between the upper and lower substrates. The color IPS-LCD device has advantages in its improved viewing angle property, such as contrast, gray inversion, and color dispersion properties.

FIG. 1 is a plan view illustrating a conventional color IPS-LCD device. As shown, on a lower substrate or an array substrate (reference 33 of FIG. 2), gate line 13 and data line 15 are formed perpendicular to each other with a pixel region "P" defined thereby. At a cross point between the gate and data lines 13 and 15, a switching device 12 is formed. The switching device 12 conventionally employs a thin film transistor (TFT). On the pixel region P, a plurality of pixel electrodes 17 and common electrodes 19 are formed. The pixel and common electrodes 17 and 19 are parallel with and spaced apart from each other on the same plane. Therefore, when a voltage source 10 generates a voltage difference between the pixel and common electrodes 17 and 19, an in-plane electric field 23 is induced therebetween. The in-plane electric field 23 operates a liquid crystal layer 21 that is interposed between the lower substrate 33 and an upper substrate (reference 25 of FIG. 2).

At this point, liquid crystal molecules arranged in the gap between the adjacent pixel and common electrodes 17 and 19 are aligned in the same direction as the in-plane electric field 23. Because each pair of adjacent pixel and common electrodes 17 and 19 involves a corresponding domain of the liquid crystal 21, a plurality of domains are present in the pixel region "P" such that a wide viewing angle is achieved.

With reference to FIG. 2, structure of the conventional color IPS-LCD device is explained in detail. As shown, between the upper and lower substrate 25 and 33, the liquid crystal layer 21 is interposed. On the lower substrate 33, the pixel electrodes and common electrodes 17 and 19 are alternately formed with gaps therebetween. On an inner surface of the upper substrate 25, a color filter 29, including color filter layer 29a and black matrix 29b, is formed, and a planar layer 45 is formed to cover the color filter 29. On exterior surface of the upper substrate 25, a ground electrode 27 is formed of a transparent conductive material such as indium tin oxide (ITO). The ground electrode 27 prevents exterior static electricity from affecting the liquid crystal layer 21. Without the ground electrode 27, the exterior static electricity may electrify the upper substrate 25 and the electrified upper substrate affects the alignment of the liquid crystal molecules. In that case, switching operation of the liquid crystal layer 21 cannot be controlled by data signals and image quality of the LCD device becomes poor.

FIGS. 3A to 3E illustrate a sequence of fabricating process for the upper substrate of the conventional IPS-LCD device. At first, as shown in FIG. 3A, the upper substrate 25 is prepared. In later steps, the color filter 29 will be formed on a first surface 25a of the upper substrate 25 while the ground electrode 27 will be formed on a second surface 25b thereof.

Thereafter, as shown in FIG. 3B, the ground electrode 27 is formed on the second surface 25b of the upper substrate 25. As explained previously, to form the ground electrode 27, the transparent conductive material such as indium tin oxide (ITO) is deposited on the upper substrate 25. Then, the upper substrate 25 including the ground electrode 27 is transferred via a carrier 41, as shown in FIG. 3C. At this point, the first surface 25a, where the color filter will be formed in a subsequent step, contacts a plurality of loaders 43 of the carrier 41. The loaders 43 are spaced apart from each other, and each of them rotates to move the upper substrate 25. Since the first surface 25a directly contacts the rotating loader 43, scratches or defects may occur on the first surface 25a.

Next, as shown in FIG. 3D, the black matrix 29b, color filter layer 29a, and planar layer 45 are sequentially formed on the first surface 25a of the upper substrate 25, which is transferred via the carrier 41 shown in FIG. 3C. In detail, chromium oxide ($CrO_x$) and chromium (Cr) are deposited on the first surface 25a and patterned to form the black matrix 29b. Thereafter, the color filter layer 29a including red, green, and blue resins "R", "G", and "B" is formed on the first surface 25a of the upper substrate 25, using photolithography. The color filter layer 29a and black matrix 29b are adjacent to each other in an array matrix shape. Then, an insulating material of a transparent polymer or the like is deposited over the first surface 25a to form the planar layer 45.

Next, as shown in FIG. 3E, the upper substrate 25 is attached to the lower or array substrate 33 via a sealant 51 such that the IPS-LCD panel 31 is completed. Then a polarizer 47 is formed on the ground electrode 27 of the IPS-LCD panel 31. The ground electrode 27 is made of the transparent conductive material and attracts contaminants or extraneous matters more than the upper substrate does. That is to say, to prevent the exterior static electricity, the ground electrode 27 is interposed between the upper substrate 25 and the polarizer 47. However, because the ground electrode 27 of the transparent conductive material attracts extraneous matter more than the upper substrate 25 of a glass material does, the extraneous matter 49 is easily interposed between the polarizer 47 and upper substrate 25 during forming the polarizer 47 on the upper substrate 25.

SUMMARY OF THE INVENTION

Accordingly, the present invention is directed to an IPS-LCD device that substantially obviates one or more of the problems due to limitations and disadvantages of the related art.

An object of the present invention is to provide an IPS-LCD device that is protected from exterior static electricity without interposing a ground electrode between a polarizer and an upper substrate of the IPS-LCD device.

In order to achieve the above object, the first preferred embodiment of the present invention provides a fabricating method for an in-plane switching color liquid crystal display device. The method includes: forming a color filter layer on a first surface of a first substrate; forming an array matrix including a plurality of common electrodes, pixel electrodes, and switching devices on a second substrate such that each common electrode is parallel to a corresponding pixel electrode with a gap therebetween; attaching the first and second substrates via a sealant; forming a ground electrode on side edge portions of a second surface of the first substrate; and forming an electro-conductive polarizer on the second surface of the first substrate such that the electro-conductive polarizer contacts the ground electrode.

The ground electrode is selected from a group consisting of indium tin oxide (ITO) and indium zinc oxide (IZO).

The step of forming the ground electrode includes: covering the second surface of the upper substrate with a mask; depositing a transparent conductive material on the second surface of the upper substrate such that the ground electrode are formed only on side edge portions of the second surface of the first substrate.

In another aspect, the present invention provides an in-plane switching liquid crystal display device, which includes: a color filter on a first surface of a first substrate; a common electrode and a pixel electrode on a second substrate; a liquid crystal layer between the first and second substrates; a ground electrode on side edge portions of a second surface of the upper substrate; and an electro-conductive polarizer on the second surface of the upper substrate, the polarizer contacting the ground electrode.

The ground electrode is selected from a group consisting of indium tin oxide (ITO) and indium zinc oxide (IZO).

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiment of the present invention, an example of which is illustrated in the accompanying drawings.

Figure 4A:
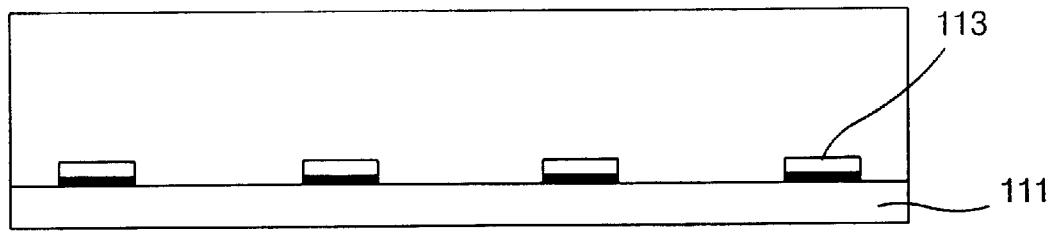
FIGS. 4A to 4D illustrate a sequence of a fabricating process for a color filter substrate and an IPS-LCD panel according to a preferred embodiment of the present invention.
Figure 4B:
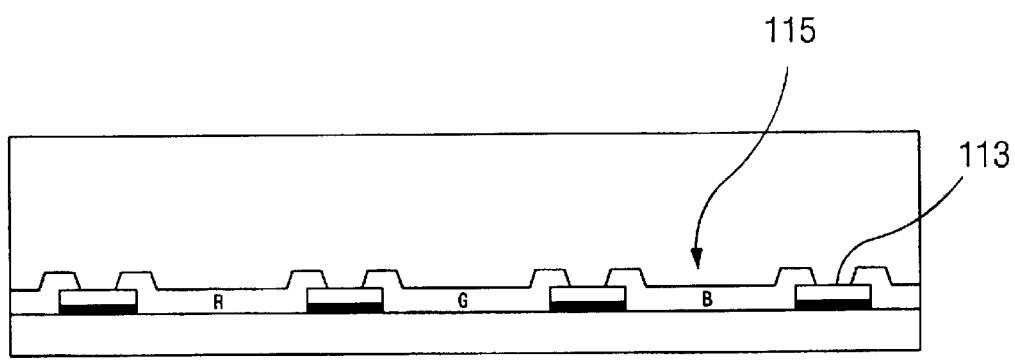
Figure 4C:
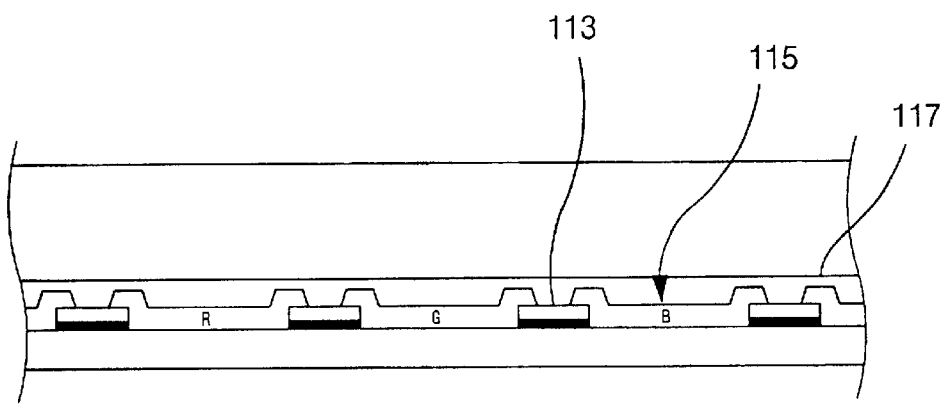

FIGS. 4A to 4D illustrate a sequence of fabricating a color filter 115 on an upper substrate 111, according to the preferred embodiment. At first, as shown in FIG. 4A, chromium oxide ($CrO_x$) and chromium (Cr) are sequentially deposited on the upper substrate 111 and patterned to form a black matrix 113. Thereafter, as shown in FIG. 4B, the color filter layer 115 including red, green, and blue resins "R", "G", and "B" is formed on the upper substrate 111, using photolithography with the same mask. Then, as shown in FIG. 4C, acryl based or polyimid based resin is deposited over the upper surface 111 to form a planar layer 117. The planar layer 117 not only levels but also protects the color filter layer 115 and black matrix 113.

Figure 1:
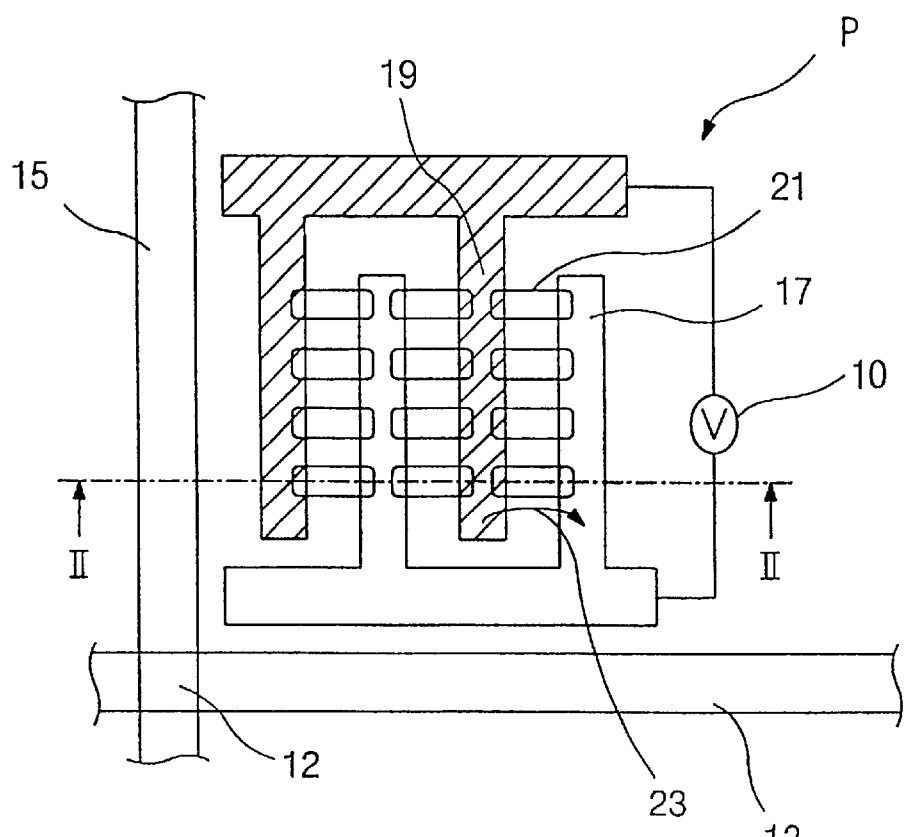
FIG. 1 is a plan view illustrating a liquid crystal display device according to the related art.
Figure 2:
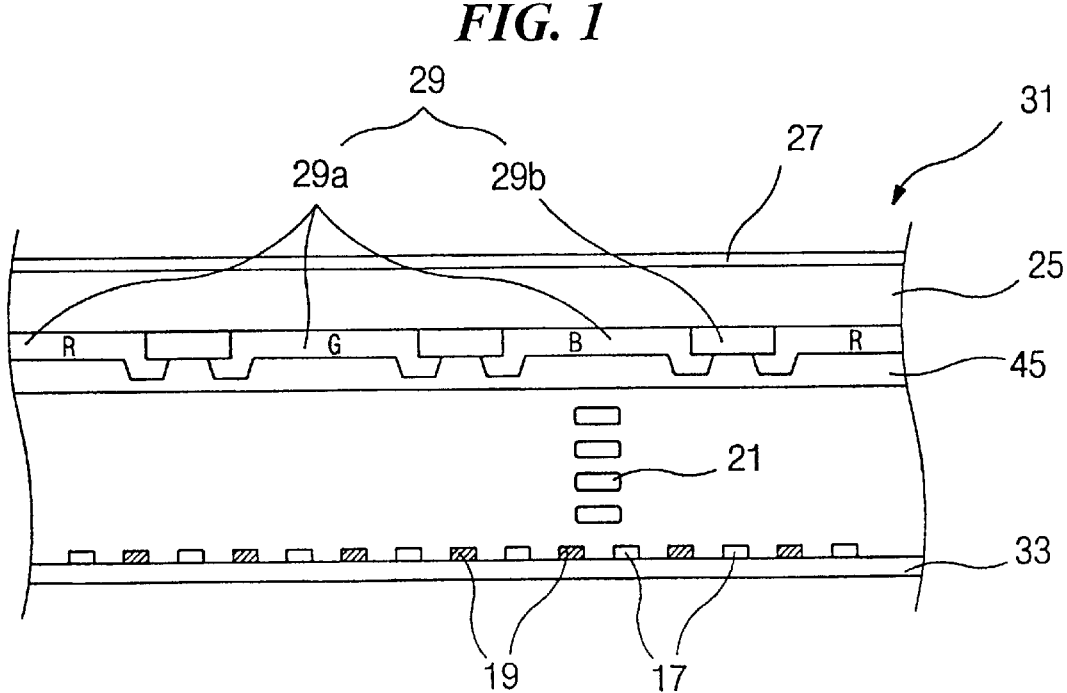
FIG. 2 is a cross-sectional view taken along a line "II—II" of FIG. 1.
Figure 4D:
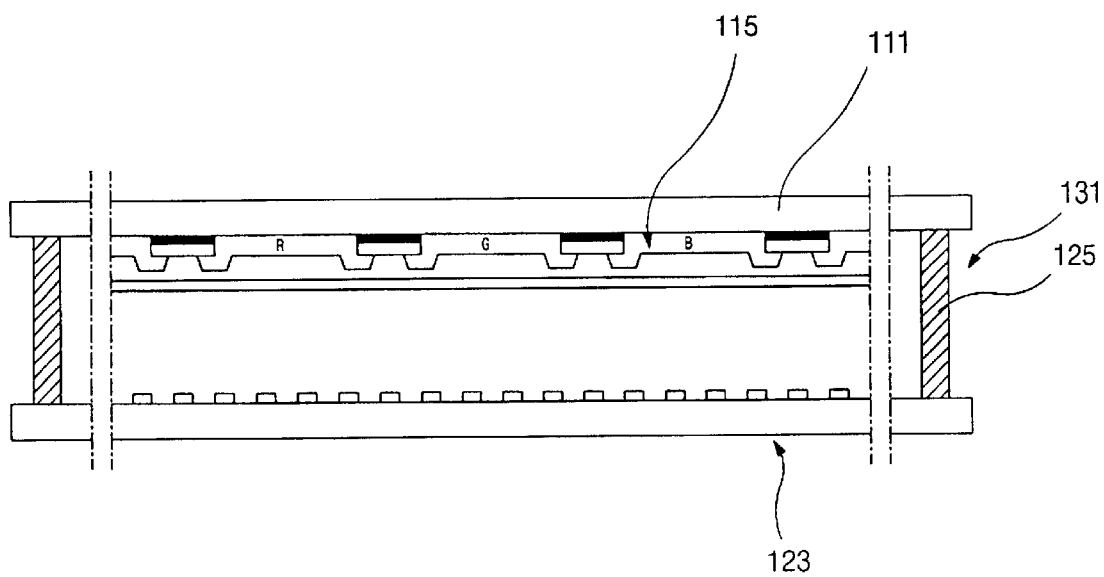

Next, as shown in FIG. 4D, the upper substrate 111 including the color filter layer 115 is attached with a lower substrate or array substrate 123 via a sealant 125 such that an IPS-LCD panel 131 is completed. Though not shown in FIG. 4D, an array of common electrode, pixel electrode, and gate and data lines are formed on the lower substrate 123 (see FIG. 1).

Figure 5A:
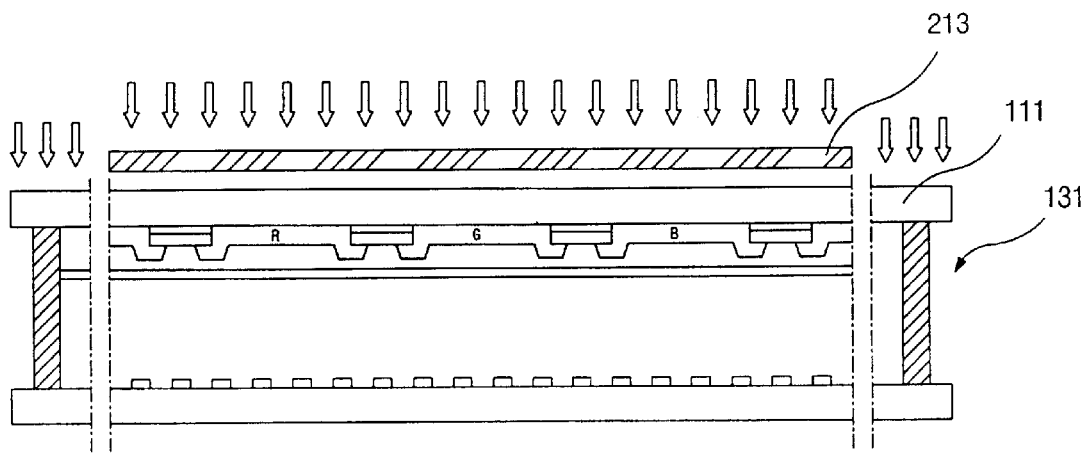
FIGS. 5A to 5C illustrate a sequence of forming an electro-conductive polarizer on the IPS-LCD panel according to the preferred embodiment of the present invention.
Figure 5B:
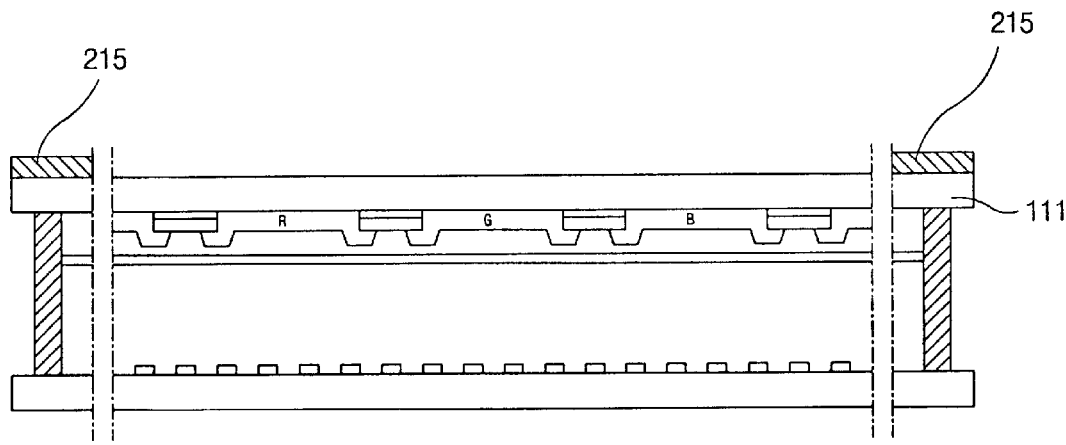
Figure 5C:
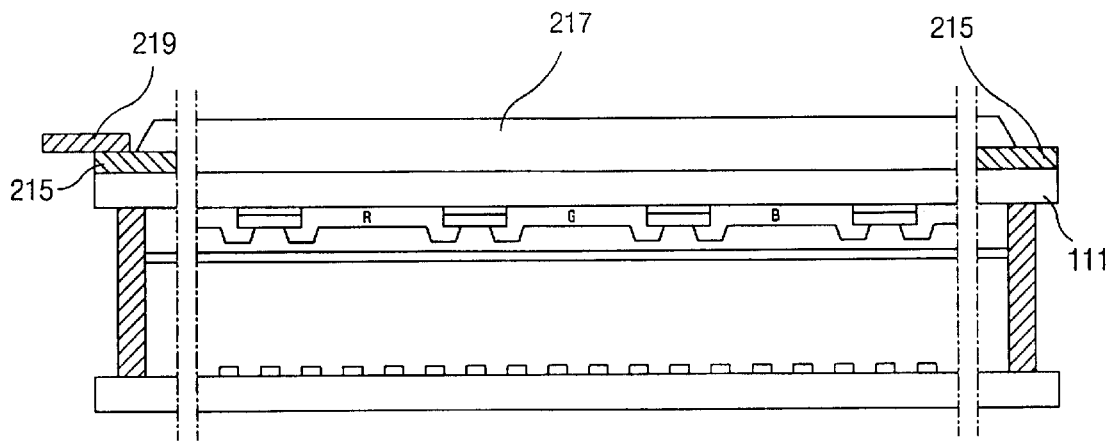

Now, with reference to FIGS. 5A to 5C, a process of forming a polarizer 217 on the IPS-LCD panel 131 is explained. At first, as shown in FIG. 5A, a mask 213 covers a middle portion of the upper substrate 111 of the IPS-LCD panel 131. Preferably, the mask 213 is selected from a group consisting of a metal and a shadow mask. Then, as shown in FIG. 5B, a transparent conductive material is deposited on the upper substrate 111 of the IPS-LCD panel 131 such that a ground electrode 215 is formed. Since the mask 213 covers the middle portion of the upper substrate 111, the ground electrode 215 is formed only on side portions of the upper substrate 111. The ground electrode 215 is preferably selected from a group consisting of indium tin oxide (ITO) and indium zinc oxide (IZO), and the upper substrate is preferably a glass substrate.

Thereafter, as shown in FIG. 5C, a polarizer 217 is formed on the upper substrate 111 such that portions of the polarizer 217 overlap inner sides of the ground electrode 215. Further, a ground line 219 is electrically connected to the ground electrode 215. One end of the ground line is grounded. At this point, the polarizer 217 preferably includes a conductive material such that electric charges are easily discharged via the ground electrode 215 and ground line 219 when the polarizer is electrified by exterior static electricity.

Figure 3A:
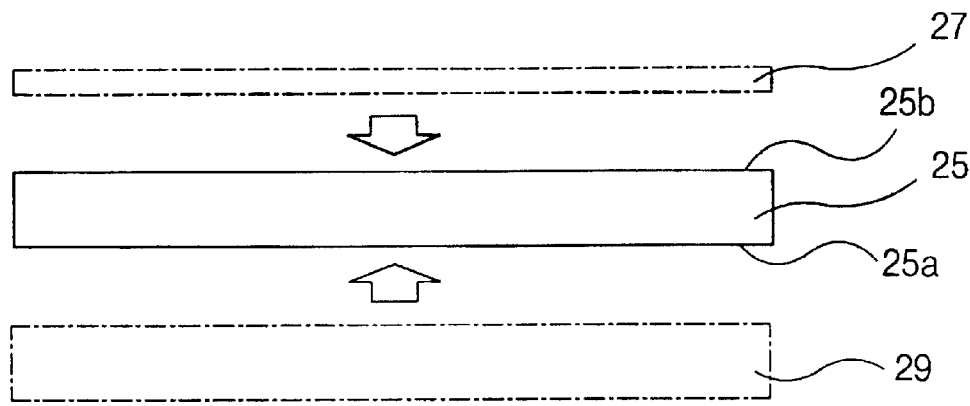
FIGS. 3A to 3E illustrate a sequence of a fabricating process for the conventional IPS-LCD device.
Figure 3B:
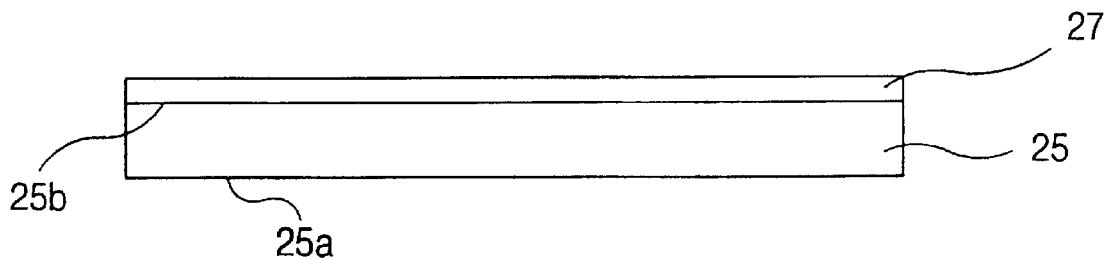
Figure 3C:
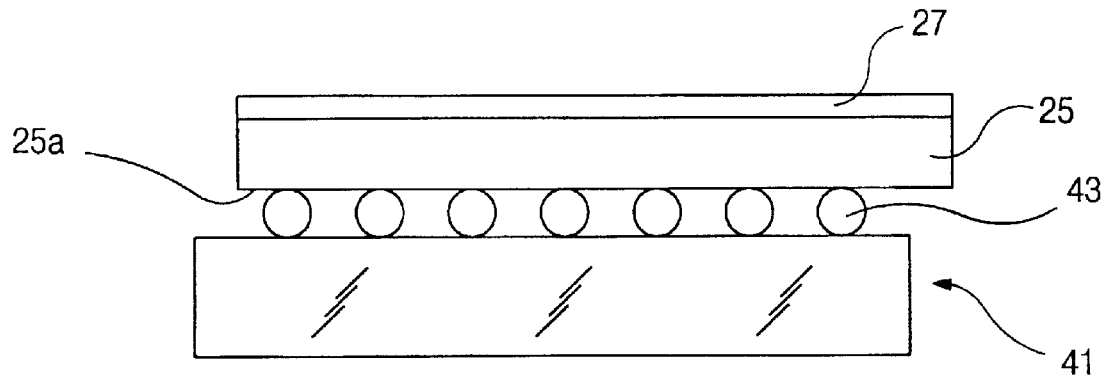
Figure 3D:
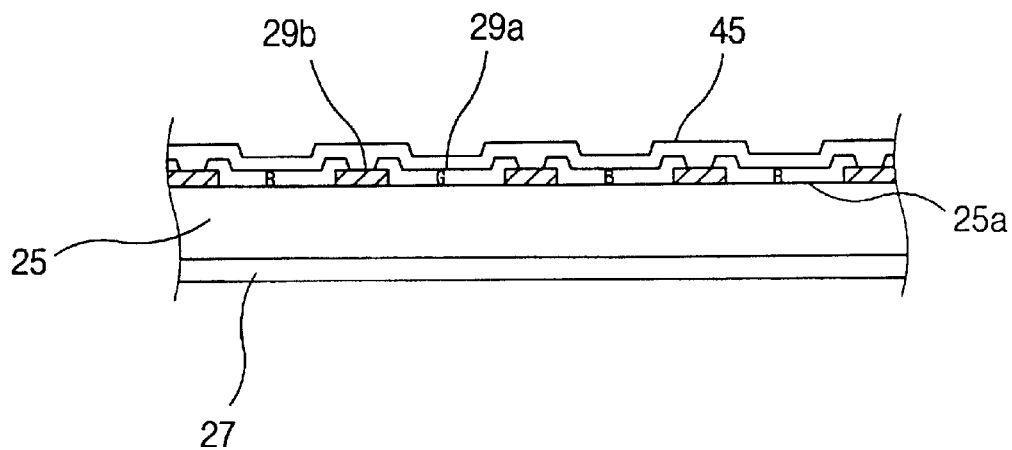
Figure 3E:
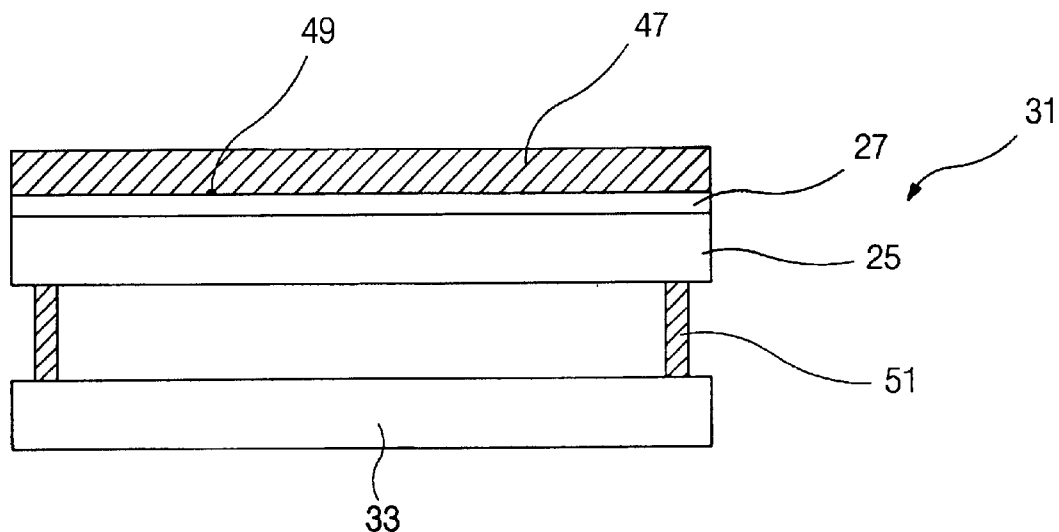

In the preferred embodiment of the present invention, the electro-conductive polarizer is directly formed on the upper substrate, and the ground electrode surrounds the side edges of the electro-conductive polarizer. Therefore, the problem of extraneous matter interposed between conventional polarizer and ground electrode, as shown in FIG. 3E, is prevented. In addition, because the upper substrate of the preferred embodiment does not need to be transferred via a carrier, as in with the conventional upper substrate shown in FIG. 3C, scratches or defects on a surface of the upper substrate are prevented.

It will be apparent to those skilled in the art that various modifications and variation can be made in the method of manufacturing a thin film transistor of the present invention without departing from the spirit or scope of the invention. Thus, it is intended that the present invention cover the modifications and variations of this invention provided they come within the scope of the appended claims and their equivalents.

What is claimed is:

1. A fabricating method for an in-plane switching color liquid crystal display device, the method comprising:
    forming a color filter layer on a first surface of a first substrate;
    forming an array matrix including a plurality of common electrodes, pixel electrodes, and switching devices on a second substrate such that each common electrode is parallel to a corresponding pixel electrode with a gap therebetween;
    attaching the first and second substrates via a sealant;
    forming a ground electrode on side edge portions of a second surface of the first substrate; and
    forming an electro-conductive polarizer on the second surface of the first substrate such that the electro-conductive polarizer contacts the ground electrode.

2. The method of claim 1, wherein the ground electrode is selected from a group consisting of indium tin oxide (ITO) and indium zinc oxide (IZO).

3. The method of claim 1, wherein the step of forming the ground electrode includes:
    covering the second surface of the upper substrate with a mask;
    depositing a transparent conductive material on the second surface of the upper substrate such that the ground electrode is formed only on side edge portions of the second surface of the first substrate.

4. An in-plane switching liquid crystal display device comprising:
    a color filter on a first surface of a first substrate;
    common electrode and pixel electrode on a second substrate;
    a liquid crystal layer between the first and second substrates;
    a ground electrode on side edge portions of a second surface of the upper substrate; and
    an electro-conductive polarizer on the second surface of the upper substrate, the polarizer contacting the ground electrode.

5. The device of claim 4, wherein the ground electrode is selected from a group consisting of indium tin oxide (ITO) and indium zinc oxide (IZO).

6. A method of fabricating an in-plane switching liquid crystal display device having an electro-conductive polarizer, comprising the steps of:
    forming a color filter and a black matrix on a first substrate, the first substrate having first side edges and an upper surface having upper surface side portions and an upper surface middle portion;
    forming an array of common electrodes, pixel electrodes, and gate and data lines on a second substrate having second side edges;
    attaching the first substrate to a second substrate using a sealant along respective first and second side edges of the first and second substrates;
    covering the upper surface middle portion of the first substrate with a mask;
    depositing a conductive material over the upper surface of the first substrate, including the upper surface side portions and the mask; and
    forming a polarizer on the upper middle portion of the first substrate.

7. The method of fabricating an in-plane switching liquid crystal display device of claim 6, further comprising the step of removing the mask before the step of forming a polarizer such that the conductive material remains on said upper surface side portions to form a ground electrode on the upper surface side portions.

8. The method of fabricating an in-plane switching liquid crystal display device of claim 7, further comprising the step of electrically connecting a ground line to the ground electrode.

9. The method of fabricating an in-plane switching liquid crystal display device of claim 6, wherein the conductive material is transparent.

10. The method of fabricating an in-plane switching liquid crystal display device of claim 9, wherein the conductive material is selected from the group consisting of indium tin oxide (ITO) and indium zinc oxide (IZO).

11. The method of fabricating an in-plane switching liquid crystal display device of claim 6, wherein the polarizer is formed to contact a side surface of the upper surface side portions.

12. An in-plane switching mode liquid crystal display device, comprising:
    first and second substrates, the first substrate having a lower surface and an upper surface, the upper surface having side edges and a middle portion defined thereon;
    common electrodes, pixel electrodes and switching elements formed on the second substrate;
    a color filter on the lower surface of the first substrate;
    a ground electrode on the side edges of the upper surface, the ground electrode having a side portion; and
    a polarizer on the middle portion of the upper surface such that the polarizer contacts the side portion of the ground electrode.

13. The in-plane liquid crystal display device of claim 12, wherein the side portions are side surfaces and the polarizer abuts the side surfaces.

14. The in-plane liquid crystal display device of claim 12, wherein the ground electrode comprises one of indium tin oxide and indium zinc oxide.

15. The in-plane liquid crystal display device of claim 12, further comprising a ground line connected to ground and the ground electrode.

* * * * *